(12) United States Patent
Chi et al.

(10) Patent No.: US 8,615,510 B2
(45) Date of Patent: Dec. 24, 2013

(54) QUICK APPLICATIONS FOR SEARCH

(75) Inventors: Liang-Yu Chi, San Francisco, CA (US);
Olivia Franklin, Santa Clara, CA (US);
Ashley Hall, Menlo Park, CA (US); Guy Hepworth, San Francisco, CA (US);
Jeremy Hubert, San Francisco, CA (US); Raj Gopal Prasad Kantamneni, San Jose, CA (US); Isabelle Peyrichoux, Mountain View, CA (US);
Harshal Sanghavi, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 286 days.

(21) Appl. No.: 12/874,118

(22) Filed: Sep. 1, 2010

(65) Prior Publication Data

US 2012/0054167 A1 Mar. 1, 2012

(51) Int. Cl.
*G06F 17/30* (2006.01)
*G06F 3/0481* (2013.01)

(52) U.S. Cl.
USPC .......................................... 707/722; 715/760

(58) Field of Classification Search
None
See application file for complete search history.

(56) References Cited

U.S. PATENT DOCUMENTS

| | | | |
|---|---|---|---|
| 7,962,504 B1 * | 6/2011 | Mehanna | 707/765 |
| 2006/0080557 A1 * | 4/2006 | Kim et al. | 713/193 |
| 2007/0050344 A1 * | 3/2007 | Rind et al. | 707/3 |
| 2007/0266384 A1 * | 11/2007 | Labrou et al. | 718/100 |
| 2008/0177708 A1 * | 7/2008 | Ayyar et al. | 707/3 |
| 2009/0125850 A1 * | 5/2009 | Karstens | 715/866 |
| 2010/0312773 A1 * | 12/2010 | Boerries et al. | 707/759 |
| 2011/0065451 A1 * | 3/2011 | Danado et al. | 455/456.1 |
| 2011/0320437 A1 * | 12/2011 | Kim et al. | 707/722 |

* cited by examiner

*Primary Examiner* — Tarek Chbouki
(74) *Attorney, Agent, or Firm* — Buchenhorner Patent Law

(57) ABSTRACT

A system and method for search, including steps of: receiving one or more search terms; searching an index for the one or more search terms to generate search results; retrieving the search results, wherein some of the search results include web pages associated with application programs; preparing a search results page for presentation to the user, wherein said search results page comprises at least a partial listing of the search results; presenting a search tool pod located on a portion of the search results page without obscuring the search results, wherein said search tool pod includes a list of application modules for executing the application programs associated with the search results that are presented; receiving a selection of a first application module; and presenting the first application module for user interaction in an area of the search results page that is smaller than the entire search results page.

20 Claims, 21 Drawing Sheets

FIG. 16

SRP In-line Prompt Examples leveraging convention result patterns

Standard Summary Style
Leverages typical user Web SRP parsing patterns

1.26EUR = 1.00 USD - Currency Converter
Convert and track currencies while searching.
search.yahoo.com /searchapps...

'Zensaro' Template Style
Allows for multiple and embedded app matches

1.26EUR = 1.00 USD - Currency Converter
Currency Exchange | Western Union | PayPal
Convert and track currencies while searching.
search.yahoo.com /searchapps...

App links can be embedded in Non-DD results as well.

Standard DD Style
Allows embedding app matches with conventional DDs

1.26EUR = 1.00 USD - Currency Converter
search.yahoo.com /searchapps...

Alternative DD Style
Could make app engagement
More discoverable and click attractive

1.26EUR = 1.00 USD
search.yahoo.com /searchapps...

FIG. 17

QUICK APPLICATIONS FOR SEARCH

CROSS-REFERENCE TO RELATED APPLICATIONS

This application contains references to material described in co-pending and commonly-owned U.S. patent application Ser. No. 12/862,324, entitled "Haptic Search Feature for Touch Screens" filed on Aug. 24, 2010, which application is incorporated by reference herein in its entirety.

FIELD OF THE INVENTION

The invention disclosed broadly relates to the field of Internet search and more particularly relates to the field of electronics for searching the World Wide Web ("WWW").

BACKGROUND OF THE INVENTION

Current search engines adhere to a set model of presenting search results as ten blue links to display information to the user. By selecting any one of these links, the user exits the search results page (SRP). Additionally, the user must navigate to several sites to complete a task. There is a need for a system and method to provide a one-stop search experience.

SUMMARY OF THE INVENTION

Briefly, according to an embodiment of the invention, a search method includes steps or acts of: receiving one or more search terms at an information processing device; searching an index of the world wide web for the one or more search terms to generate search results; retrieving the search results, wherein some of the search results include web pages associated with application programs; preparing a search results page for presentation to the user, wherein said search results page includes at least a partial listing of the search results; presenting a search tool pod located on a portion of the search results page without obscuring the search results, wherein said search tool pod includes a list of application modules for executing the application programs associated with the search results are presented; receiving a selection of a first application module; and presenting the first application module for user interaction in an area of the search results page that is smaller than an entirety of the search results page. The applications can also be built by Yahoo! and other third parties for inclusion i.e., manual insertion. The method can also be implemented as an information processing machine or machine executable instructions executed by a programmable information processing system.

According to the invention, the method further includes performing computations and searches from within the application module without a page reload, in response to the user interaction. The search tool pod can be presented as a drop down menu listing the application modules.

The application module can be presented as a window overlay if the module does not require a wide area display. The window overlay can be offset so that the both the search tool pod and at least a portion of the search results are visible on the search results page. Further, the method includes pushing down the search results display area by an application stage interface when the module does require a wide area display.

The method can also be implemented as machine executable instructions executed by a programmable information processing system; as program instructions embodied in a computer program product; or as hard coded logic in a specialized computing apparatus such as an application-specific integrated circuit (ASIC).

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which:

FIG. 6 is just an extended view of FIG. 5. It allows us to show a description to showcase to the user what the application does.

FIG. 16 shows inline prompt examples leveraging convention result patterns.

FIG. 17 shows a screenshot of search a results page resulting from a search for "restaurants 94109" according to another embodiment of the present invention.

Figure 1:
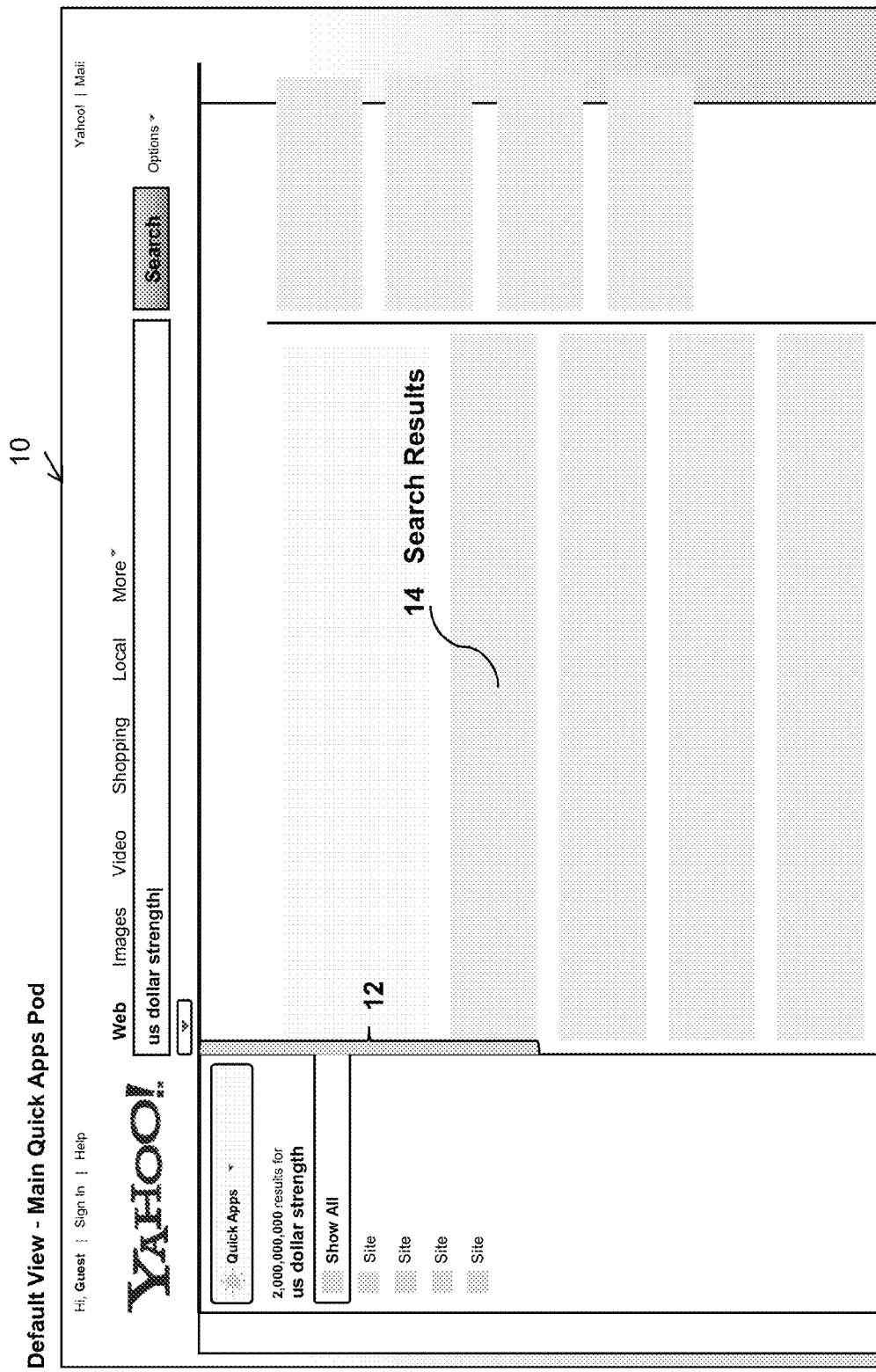
FIG. 1 is a screenshot of a search results page according to an embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a flexible framework for search that allows triggering and interaction with multiple applications or object handlers from within a search results page (SRP), without the user having to migrate away from the SRP. Applications presented to the user will aid faster task completion and provide a secondary level of rich data and interaction that is not provided by current Search Engines by harnessing the power of the WWW's applications.

Figure 20:
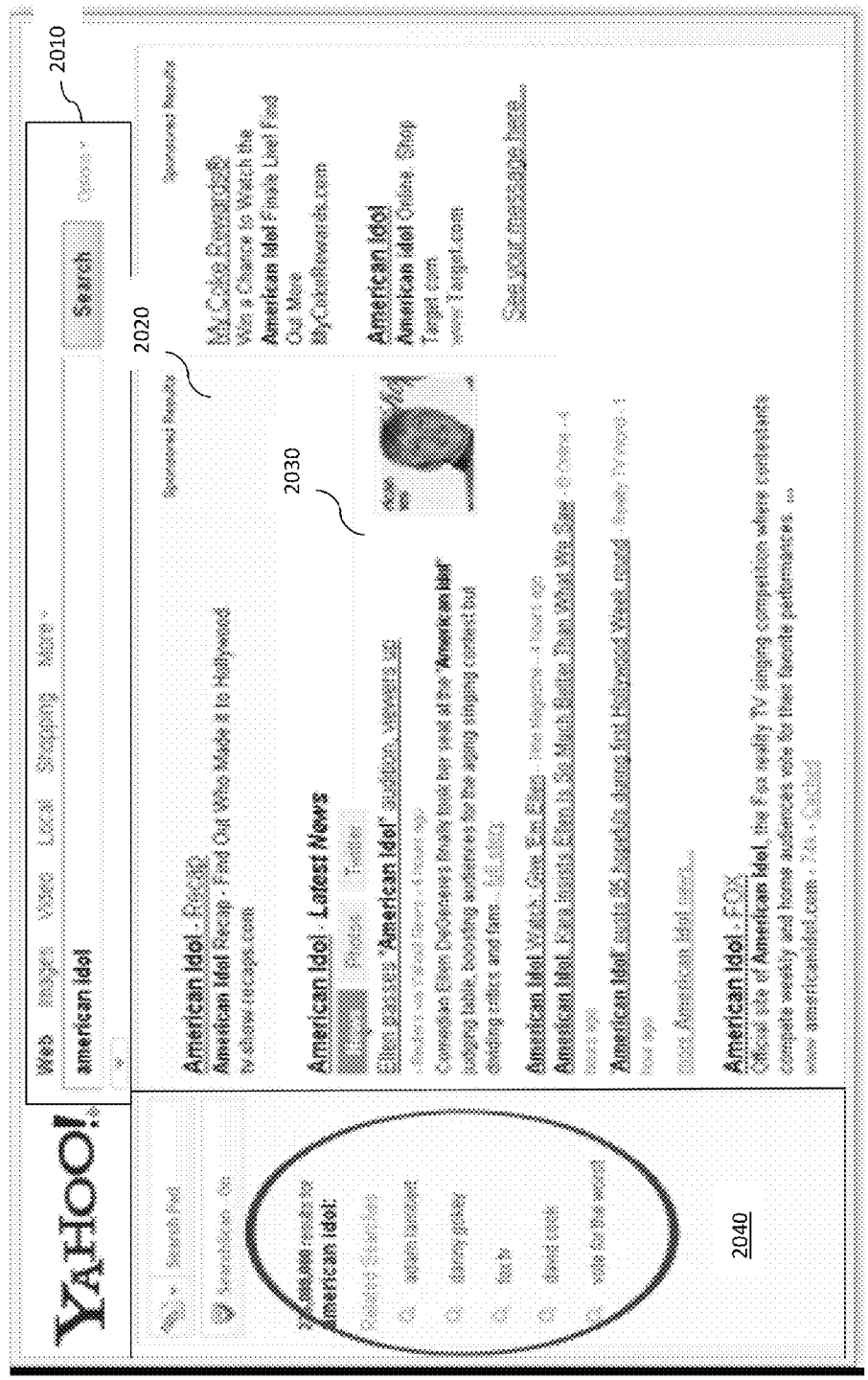
FIG. 20 is a screenshot showing an exemplary Yahoo! SRP, according to the known art.

Although the invention described herein is not limited to any particular search engine, the examples used to describe this invention are shown in conjunction with the Yahoo! SRP because of its variety of features. Referring to FIG. 20 we show an exemplary Yahoo! SRP 2000. The Yahoo! SRP 2000 is divided into four main sections: 1) the Search Box 2010; 2) the Sponsored Results section 2020; 3) the Web Results section 2030; and 4) the Left Navigation Area 2040.

Applications will be triggered based on the user's intent which can be manifested as task completion, research, or browse mode. Applications can also be triggered by keyword or category match. The initial triggering will rely on existing triggering logic provided by an internal QP (Query Planner) technology.

We then augment the QP technology with matching configuration logic as follows: when the user enters "X" query term, then display "Y" application on the SRP. This process is sophisticated and "self learning" in terms of being able to identify a user's intent and match applications appropriately. A Query Planner is an internally developed technology that already exists within the Yahoo! search engine. The system contains algorithmic logic that allows one to determine user intention and then display "exact match" modules on the SRP that meet the user's query intent.

A basic example follows: assume a user enters the query "movies 94109;" then based on past user data that has been collected, we can say with high confidence that this user is looking to go to the cinema in the area of zip code 94109. We can then say based on this action we will display a comprehensive module containing the film listings and times for cinemas in the zip code 94109.

Whitelists are simply lists of data that the search engine personnel create manually with an editorial team. These lists contain exact match keywords, for example "pizza" or phrases. If a user enters one of these keywords then we can trigger an application. Configuration logic is simply a piece of code that matches an application to an action such as when a user enters the query "pizza San Francisco" then this query flags in either the Whitelist or QP. We then match it with the application described in U.S. patent application Ser. No. 12/862,324, entitled "Haptic Search Feature for Touch Screens."

Figure 21:
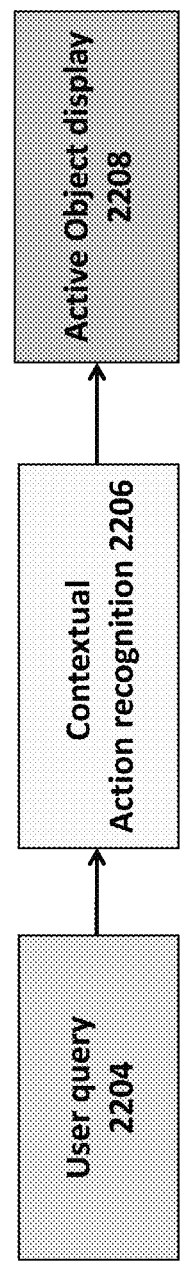
FIG. 21 shows a high-level diagram of a concept model, according to an embodiment of the present invention.

Referring now to FIG. 21 we show a basic diagram of a concept model according to the invention. We recognize the WWW as a series of page objects 2204. We understand what these Web page applications do and trigger them as a series of contextualized actions 2206 by the user. The Active Applications 2208 are presented to the user in the most applicable environment, whether it is on or off the SRP. In an embodiment of the invention, monetization models will allow vendors to bid on which Active Applications 2208 will be presented.

Figure 19:
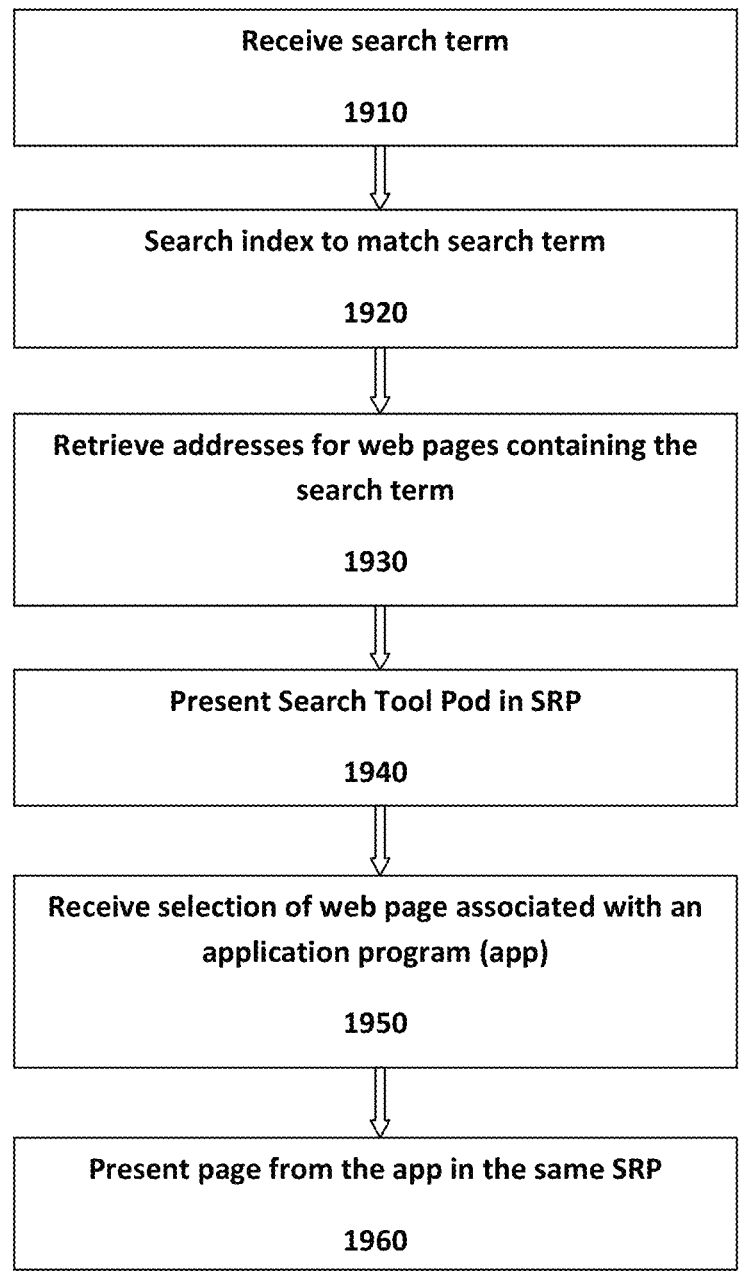
FIG. 19 is a high-level flowchart of a search method according to an embodiment of the present invention.

Referring now to FIG. 19, we show a flowchart 1900 of a search method according to an embodiment of the present invention. According to the invention, a method for searching for one or more documents on the Internet begins at step 1910 wherein the system receives one or more search terms (queries) at an information processing device. In step 1920 the system searches at least one index of the Internet for the one or more search terms to find search results. In step 1930, responsive to the search request, the system retrieves addresses of documents from the search results containing the search term from the index, wherein some of the web results include web pages with associated application programs (or simply "apps").

The system then prepares and presents a Search Tool Pod ("pod") within the SRP at step 1940. The pod is a persistent dock preferably located in the Left Navigation Area 2040 to provide the user with a consistent point of recall. The pod will display a list of modules of the associated application programs from step 1930. The system then receives a selection of one of the application modules in step 1950. The selected application module is provided in the SRP in an area of the screen of the SRP that is smaller than the entire SRP at step 1960. In this manner, both the Search Results 14 and the module are visible to the user. The user can interact with the application module without leaving the SRP.

By way of example, we refer to FIG. 1 where there is shown a screen shot of a SRP 10 resulting from a user performing a WWW search on US Dollar strength, according to an embodiment of the present invention. The pod 12 is shown in the Left Navigation Area of the SRP 10. The pod 12 must not take up a large amount of space so that the various search results 14 are not obscured by the pod 12 and appear in the center of the SRP 10. Preferably the pod 12 will list any application modules associated with any of the search results 14 that are provided on the SRP.

Figure 2:
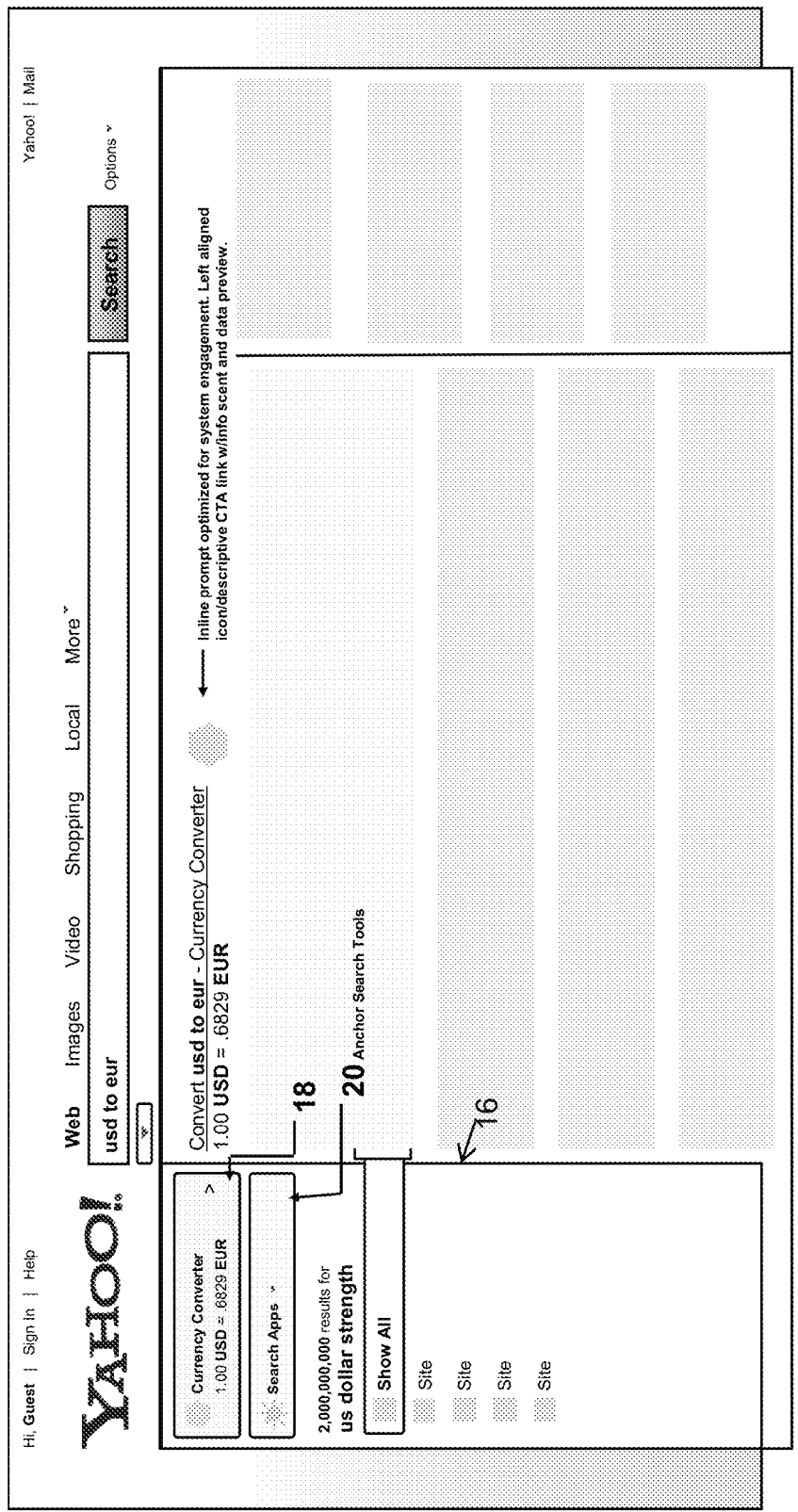
FIG. 2 is a screenshot of a default view of the main interface Search Tool Pod, according to an embodiment of the present invention.

Referring to FIG. 2, we show an inline direct display (DD) 16 and a left rail pod with DD. The Quick Apps Tool Bar 16 appears on the left-hand side of the screen. This is the default search tools system anchor point in the default position. It provides persistent access to the Search Tools list. A suggested Search Tool Pod placement 18 is shown with DD for information sent to support learnability and consistent access. An Anchor Search Tools System pod 20 is also shown in matching position. In this example the user is searching for a currency converter for converting US Dollars to Euros. The search produces a SRP 10 with an available application module that is presented in the Search Tool Pod 12 on the left of the SRP 10.

Figure 3:
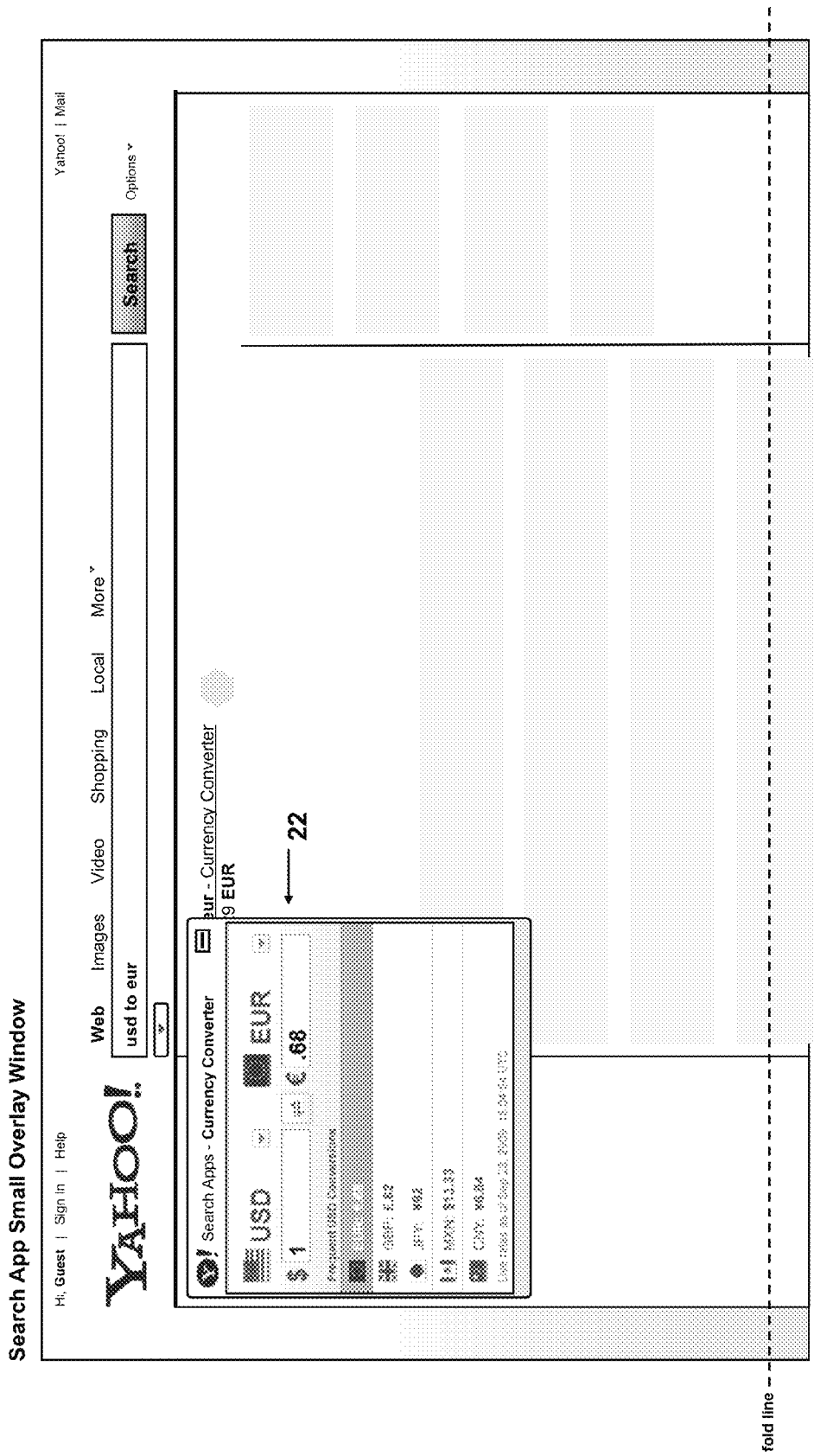
FIG. 3 is a screenshot of the search results page resulting from a search for US Dollar strength showing the non session-aware Search Tool Pod Window, according to an embodiment of the present invention.

Alternatively, a small window overlay 22 used for applications that do not require a wide area display surface is presented in FIG. 3. The Search Tool Window 22 can be made to custom sizes. The window 22 is offset to help maintain situational awareness by keeping the left rail elements in view, along with a large amount of the main results area 14. The Search Tool Pod is able to perform sequential computations and searches from within the app window 22 over the existing SRP without a page reload.

The entire page elements outside of the window 22 are locked out until the app window 22 is closed. Clicking anywhere off the window 22 or clicking the minimize icon ("-") will close the window 22. The non-session aware Search Tool Pod Window 22 remains in state once 'opened,' even if minimized and automatically exits upon SRP reload or session expiration. Session-aware Search Tools, however, such as the Search Tool Pod 12, are minimized on SRP reloads but do not close until explicitly closed by the user.

Figure 4:
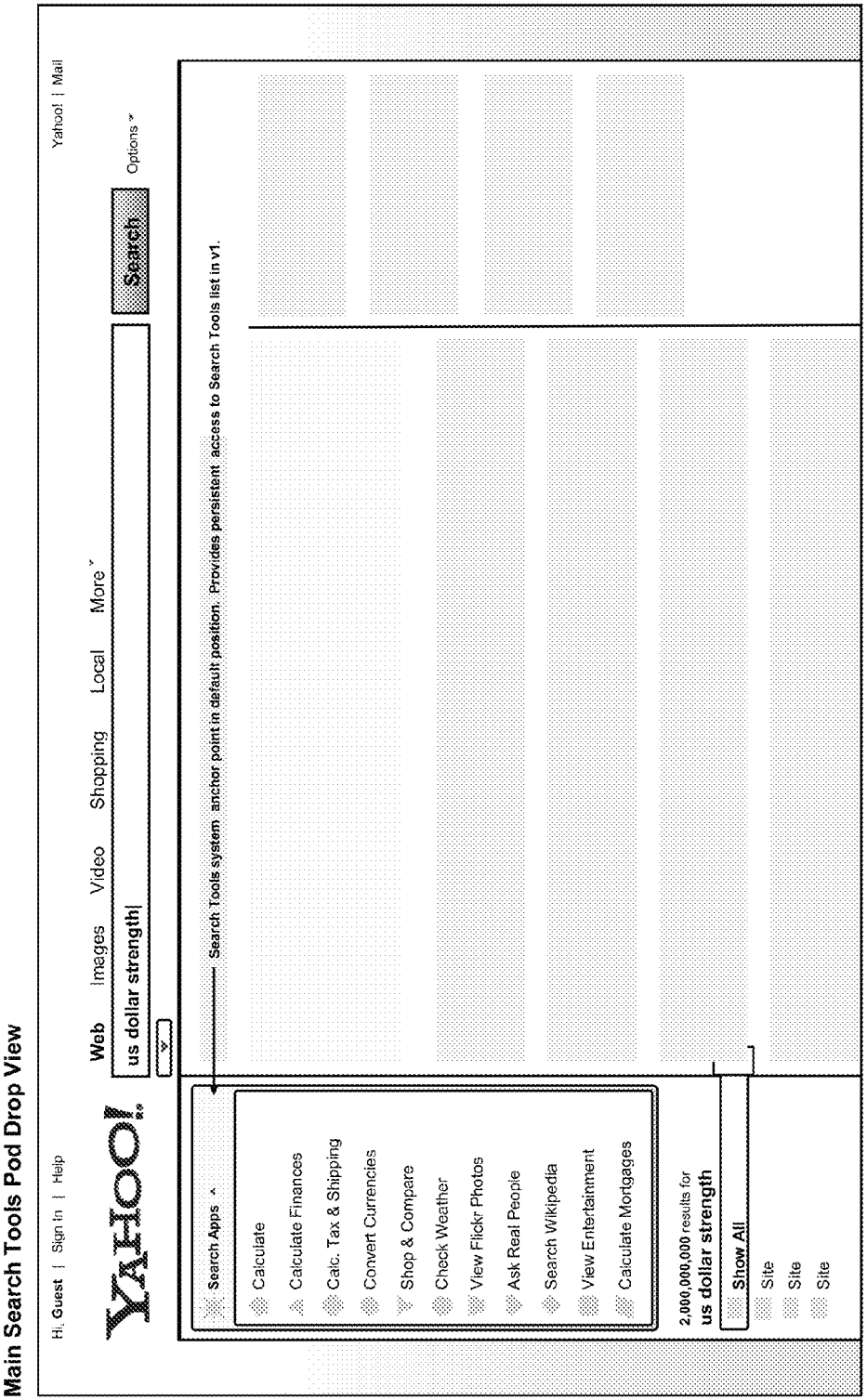
FIG. 4 is a screenshot of a search results page resulting from a search for US Dollar strength showing the Search Tool Pod drop view, according to an embodiment of the present invention.
Figure 5:
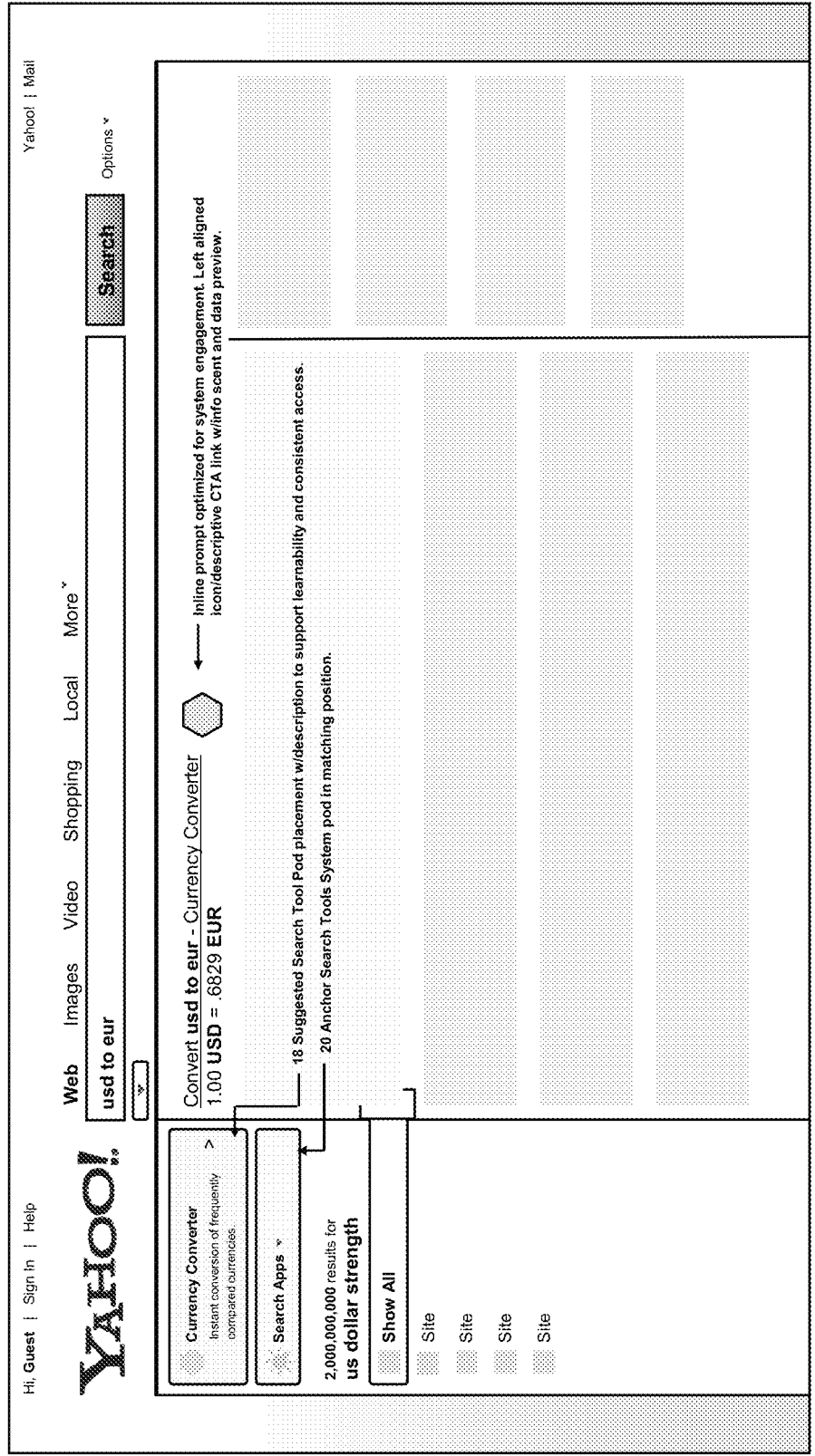
FIGS. 5 and 6 show screenshots of a search results page showing an inline DD prompt and left rail pod with a search tool pod description, according to an embodiment of the present invention.

FIG. 4 shows a main search tools pod drop view showing a drop down menu. In this example, a search is done on "US Dollar strength." The search tools system anchor point is in a default position and provides a persistent access to Yahoo! Search Tools. FIG. 5 shows a suggested Quick App Inline DD prompt and left rail pod with tool description. In this case a search for "usd to eur" results in a SRP with a suggested search tool pod placement with a description to support learnability and consistent access. The anchor search tools system is in matching position.

Figure 6:
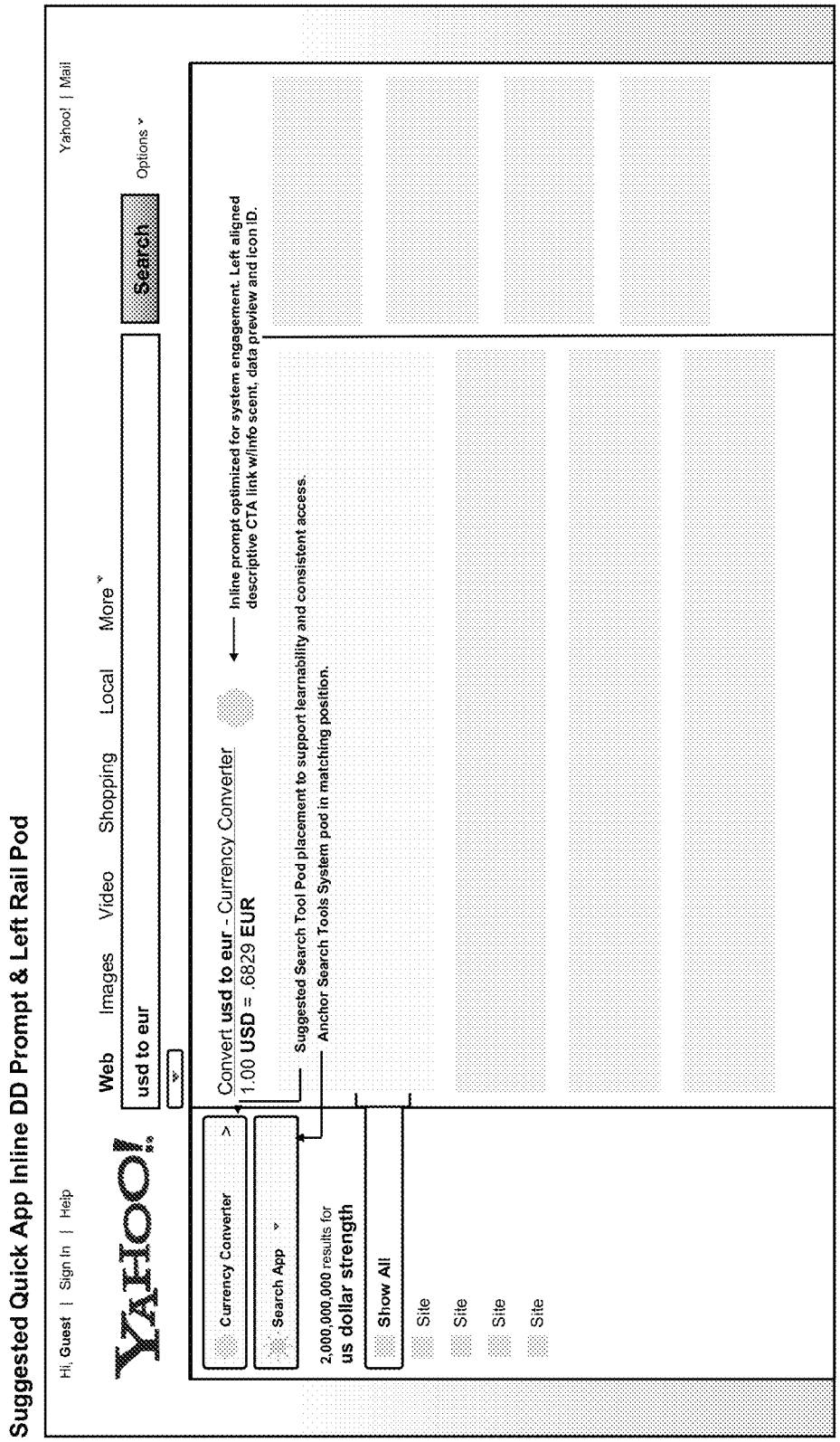

FIG. 6 shows a suggested Quick App Inline DD Prompt and left rail pod. The system recognizes that a search for "usd to eur" requires a currency converter to be displayed and an anchor search tools system pod in matching position, i.e., the system pod is matched in the same position as the application prompt in the left hand rail such that they are shown together.

Figure 7:
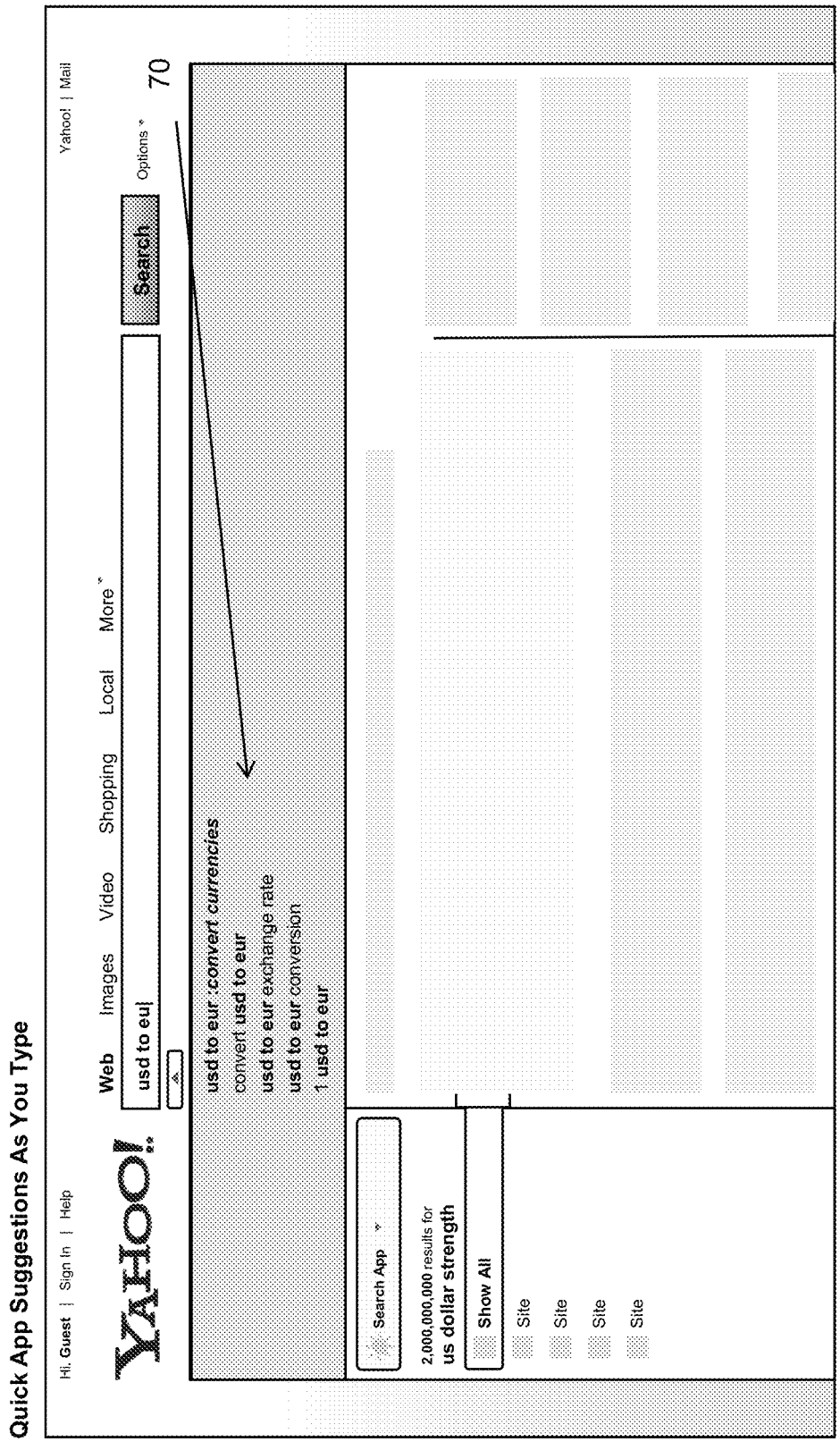
FIG. 7 is a screenshot of a search results page displaying the Quick App Suggestions As You Type feature, according to an embodiment of the present invention.

FIG. 7 illustrates the "Suggestions As You Type (SAYT)" 70 feature. In this case, the user begins to type "usd to eu" as a search term. The system recognizes what the user wants and provides a set of auto-completed options. The SAYT feature 70 presents a direct display (DD) of computable data "as you type" when possible. If an application is present to deal with this data, then a link (similar to the inline algo trigger CTA) will be displayed next to the "as you type" data to allow the application to be opened directly.

Figure 8:
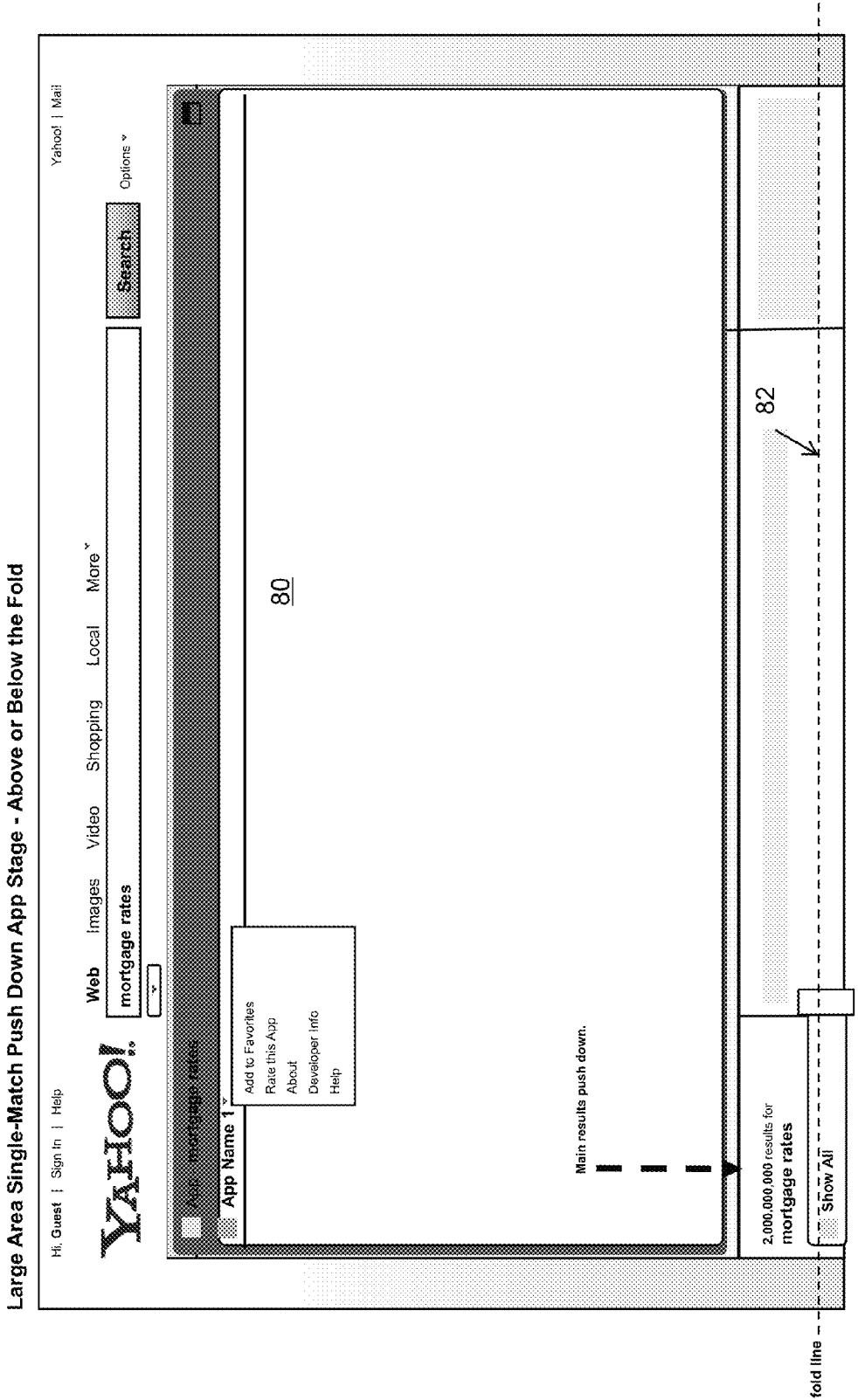
FIG. 8 is a screenshot showing a large area single-match push down, according to an embodiment of the present invention.

FIG. 8 shows a Large Area Single-Match Push Down App Stage 80, which can appear above or below the fold feature 82. In the example of FIG. 8, the user entered a search term "mortgage rates." The entire results area is pushed down by an "app stage" surface 80 similar to the way Yahoo! Search Assist surface pushes the results area down. Yahoo! Search Assist automatically offers helpful search words and phrases to refine your search, as you type. The large area stage 80 is then opened the full width of the content area providing adequate horizontal space for page level data display. The above the fold version is preferable for data formats that can be parsed easily in shorter vertical areas. This allows the top of the main results to remain above the fold 82 for better situational awareness. Above the fold refers to the visible area of the screen that can be seen by the user i.e. the area that the user can see without using the vertical scroll bar. By having this view we allow the user to still see the first algorithmic search results on the page so the user has situational awareness that they are still on the SRP and have not navigated away from the page.

The large area window 80 can be set to a maximum height that extends below the fold 82 in cases where optimal content parsing can only be achieved with more vertical space than the above the fold window configuration can provide. The maximum vertical dimension will be specified for what would be viewable in one screen for the optimal percentage of the app's target audience. When the app stage is minimized or the app is quit the push down surface is retracted and the page returns to standard default configuration.

Figure 9:
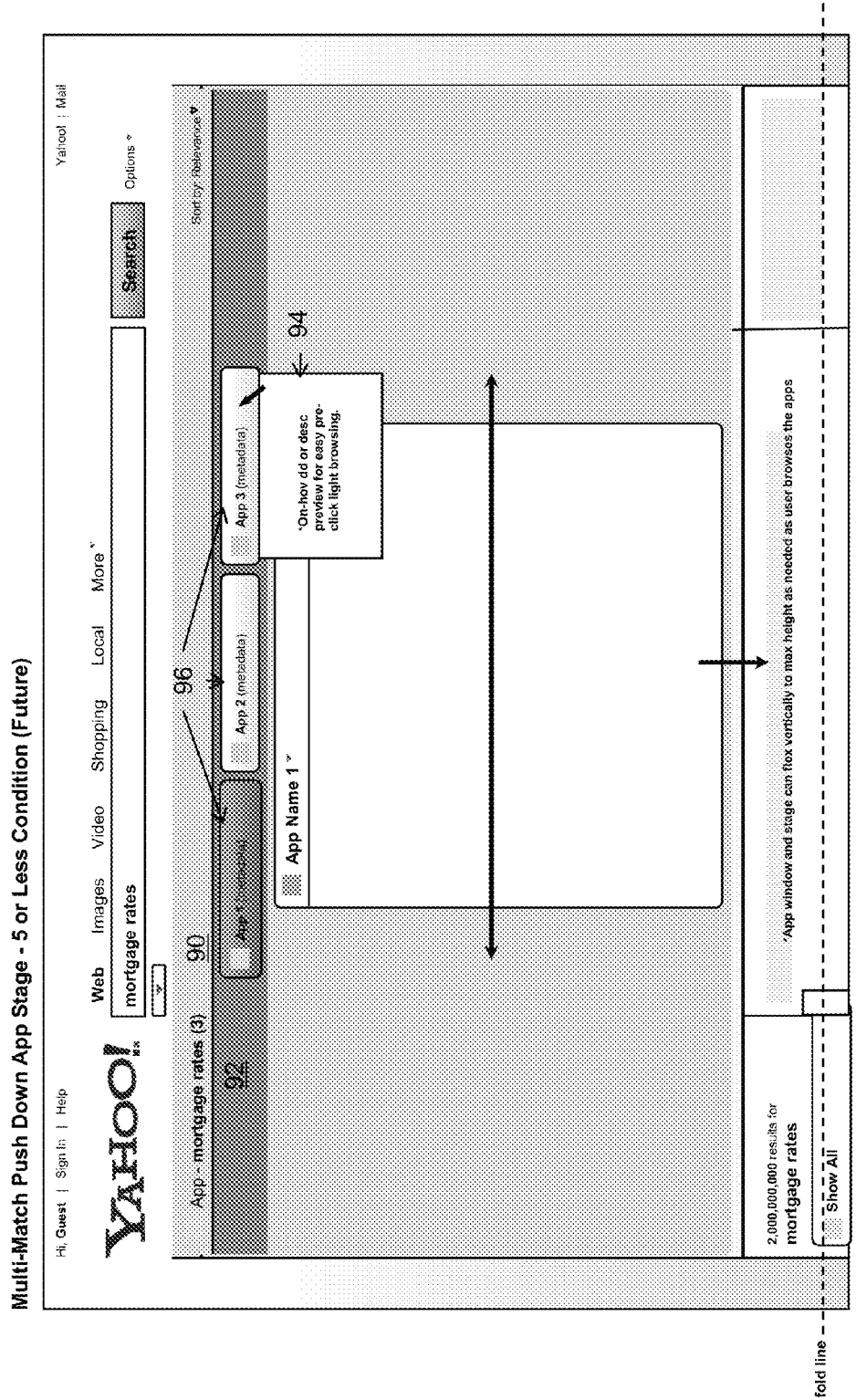
FIG. 9 is a screenshot showing a multiple application push down stage, according to an embodiment of the present invention.

FIG. 9 shows a Multi-Match Push Down App Stage for five or less Condition feature 90. In this exemplary entry of a search for mortgage rates, the system provides a bar 92 with multiple tabs (App windows) 96. Each tab 96 provides a pull-down menu 94 with a descriptive preview for light browsing. The App windows 96, when selected, are always centered and can flex horizontally to the maximum width of the results area as needed as the user browses the apps 96. The App window 96 and stage can flex vertically to max height as needed as user browses the apps.

Figure 10:
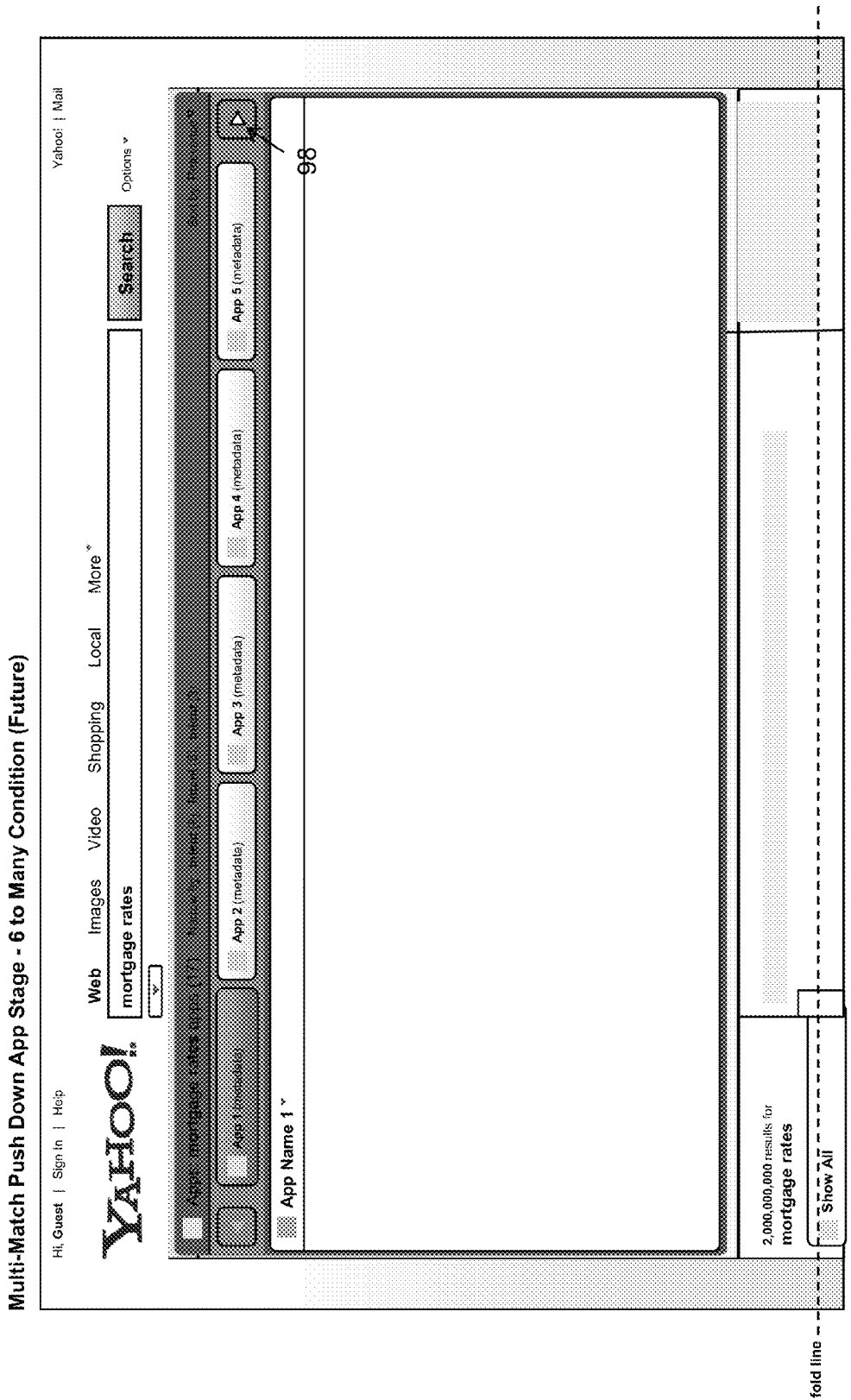
FIG. 10 shows screenshots of search results pages resulting from a search for mortgage rates according to an embodiment of the present invention.

FIG. 10 shows a Multi-Match Push Down App Stage for six plus Condition feature. In this case the search for "mortgage rates" produces 17 apps. The first five apps are shown. The remaining apps can be displayed by selecting the next arrow 98 to the right of the tabs 96. The display provides a view of metadata for App 1.

Figure 11:
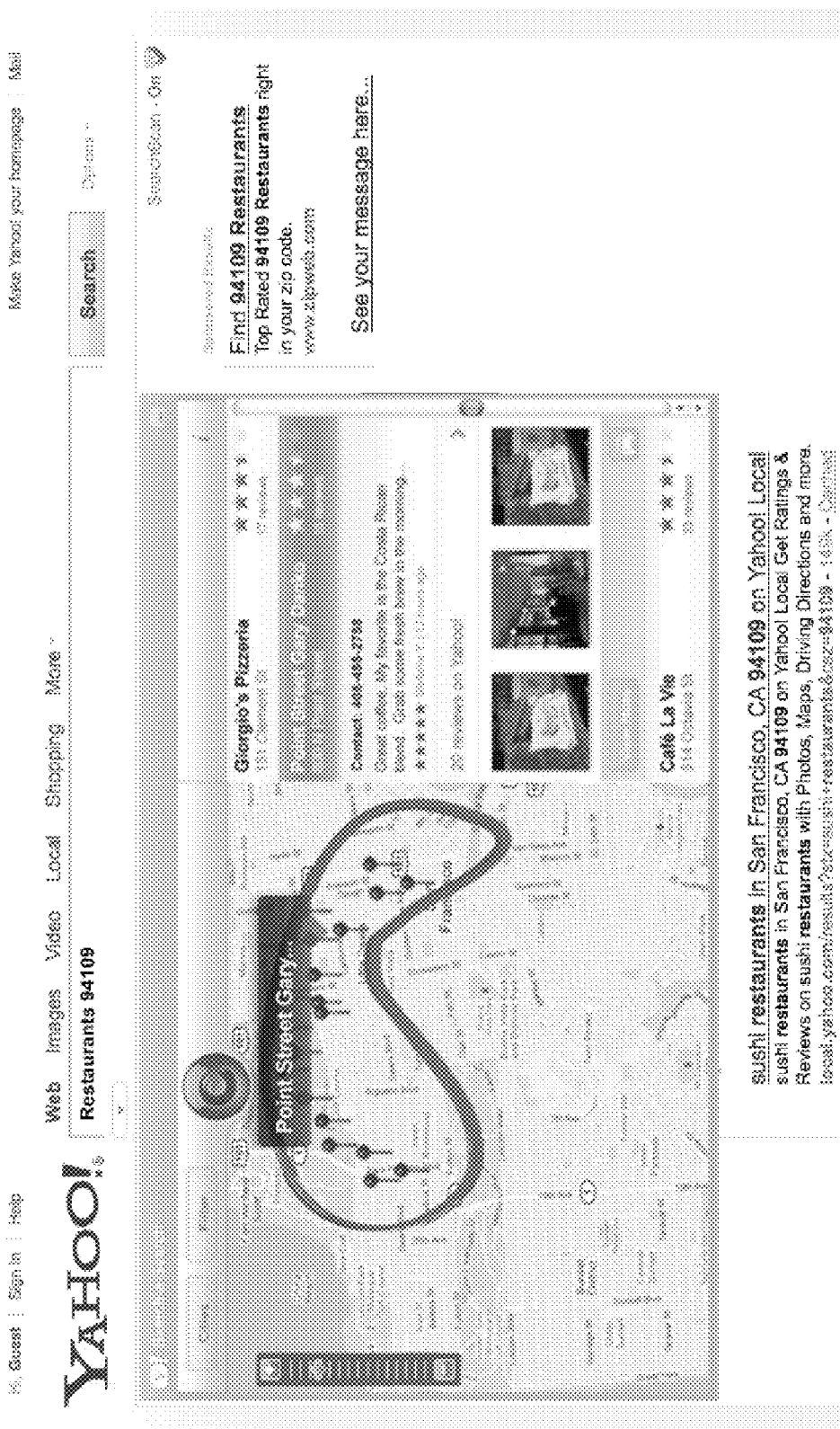
FIGS. 11-12 show screenshots of search results pages resulting from a search for restaurants 94109 according to another embodiment of the present invention.

FIG. 11 shows an example of a user flow. A search for "restaurants 94109" presents a map where the feature described in "Haptic Search Feature for Touch Screens" provides the user with an option to specify an area by drawing a circle in the map.

Figure 12:
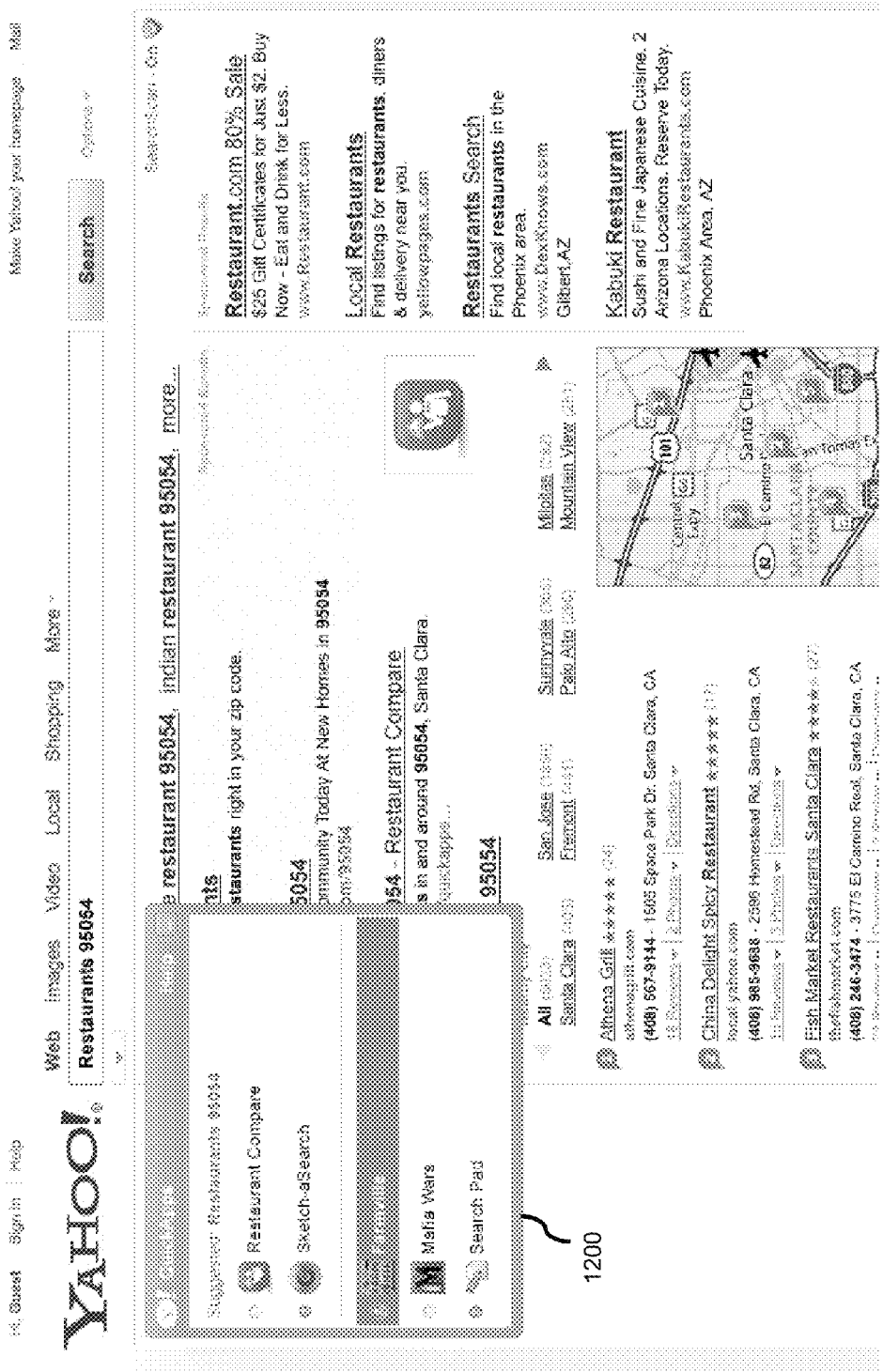

FIG. 12 shows a Quick Apps dock 1200 display. A search for "restaurants 95054" provides a Quick Apps dock window 1200 in the SRP. The Quick Apps dock 1200 identifies several options for the user.

Figure 13:
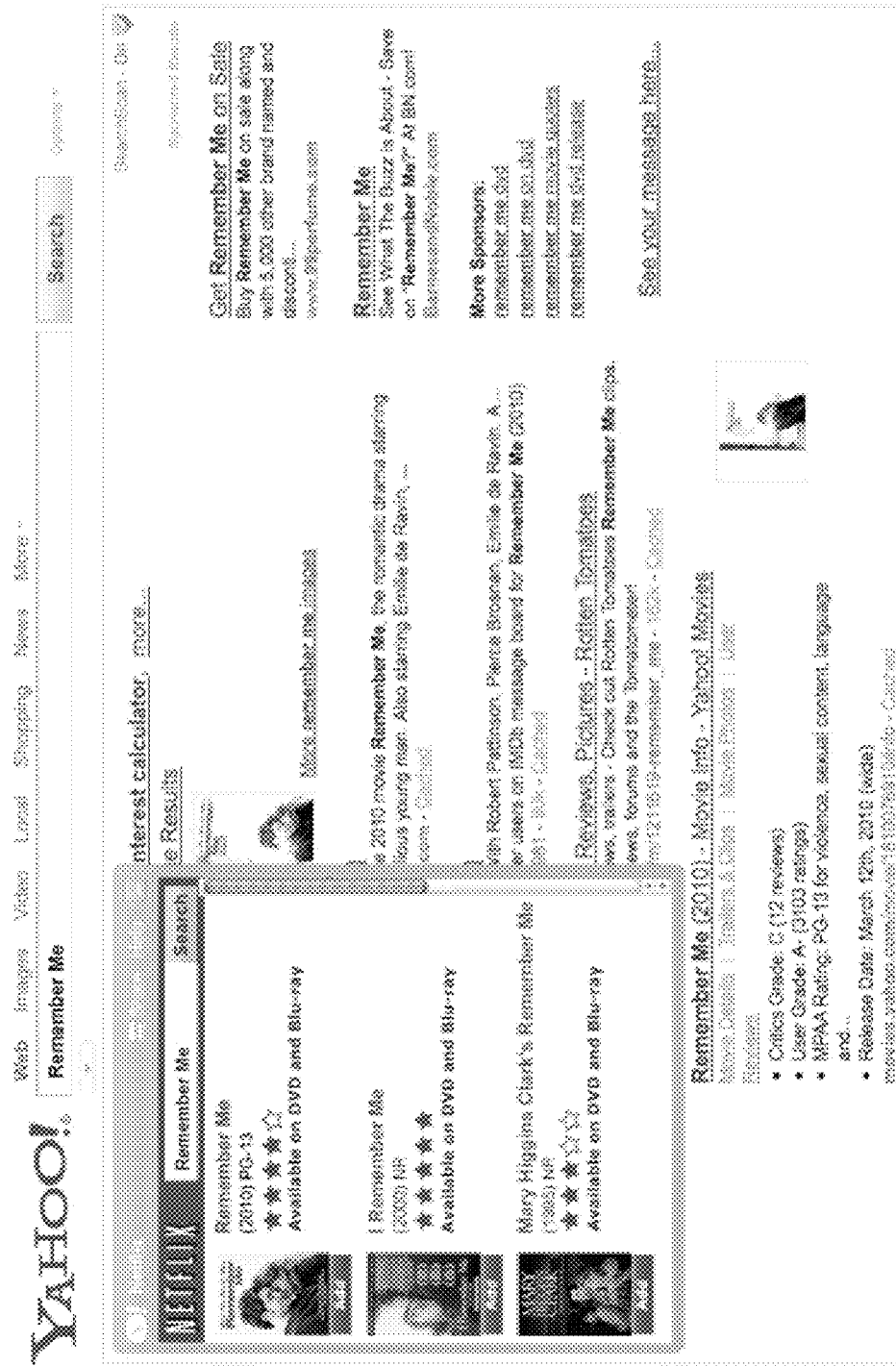
FIGS. 13-14 show screenshots of search results pages resulting from a search for a movie title.

FIG. 13 shows a small window 1300 resulting from a search for "remember me." The small window 1300 shows search results for a search on "remember me." The Netflix application is then shown to allow the user to add the title to their Netflix® queue. Netflix® is an on-line subscription service for providing streaming of TV episodes and movies.

Figure 14:
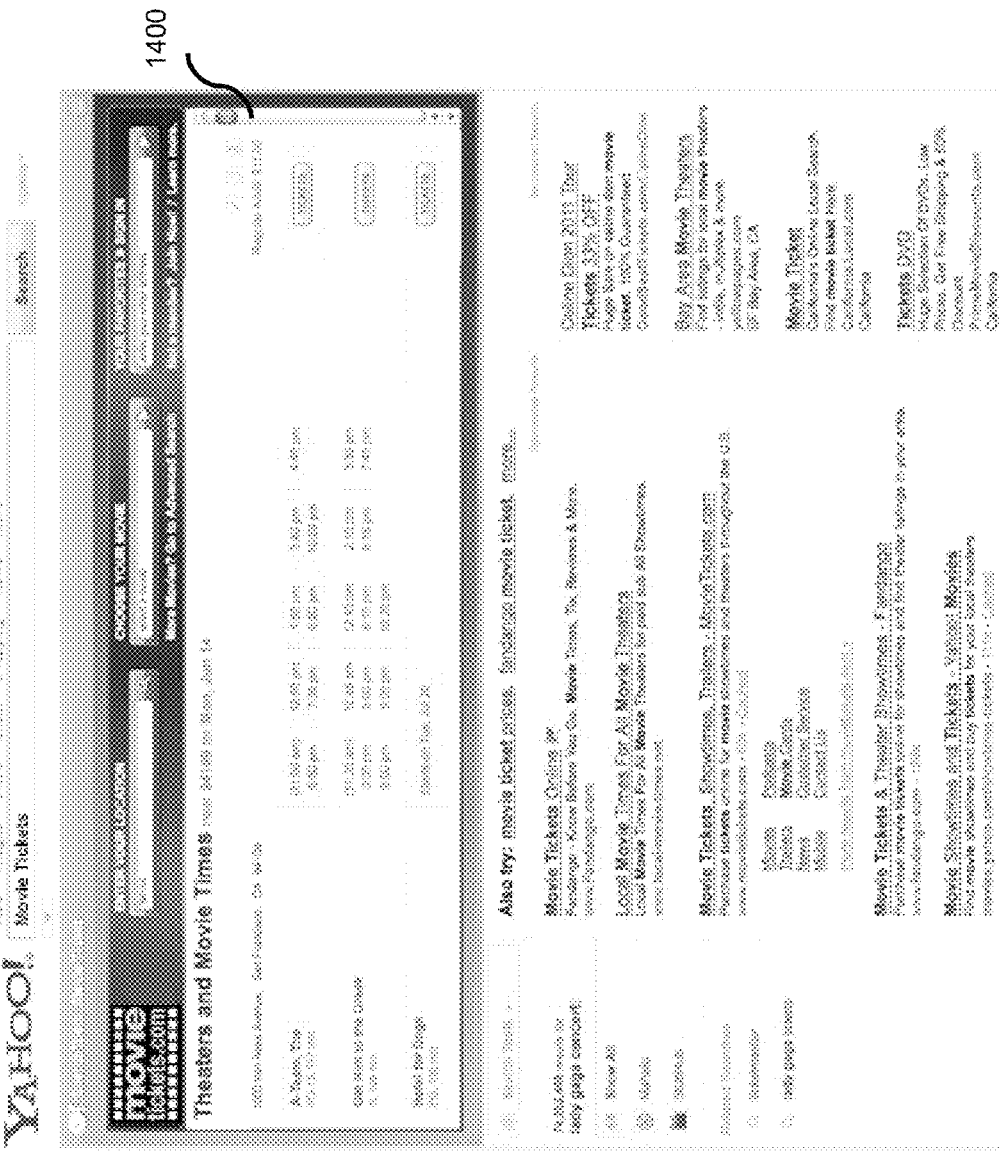

FIG. 14 shows a full stage display resulting from a search for "movie tickets." A larger window 1400 provides an application for the sale of tickets for various movies showing in the user's area.

Figure 15:
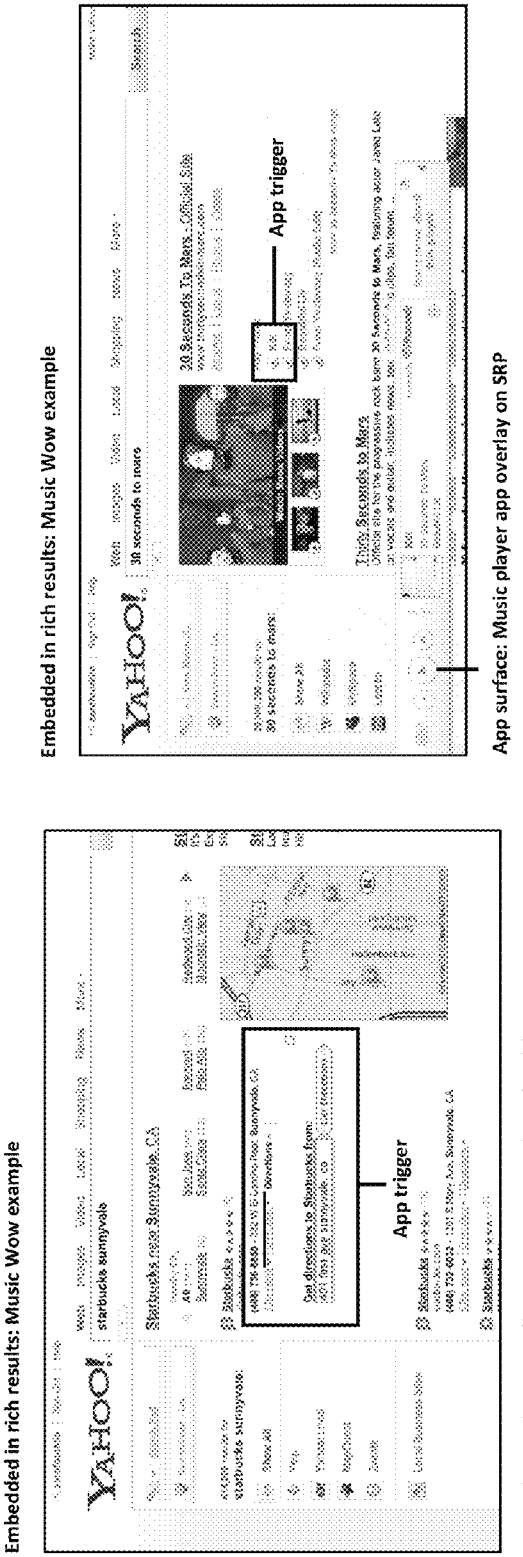
FIG. 15 shows embedded interaction points according to another embodiment of the present invention.

FIG. 15 illustrates how apps are prompted. Embedded interaction points provide calls to action to trigger an application as part of a rich result or feature. These initial triggers are based on simple QP logic and editorial category and keyword classification. Consider a search for "starbucks sunnyvale" which results in the display of an app surface that takes the user off-SRP to Yahoo! Local SRP for directions. A search for "30 seconds to mars" produces an app surface player app overlay on the SRP.

Figure 17:
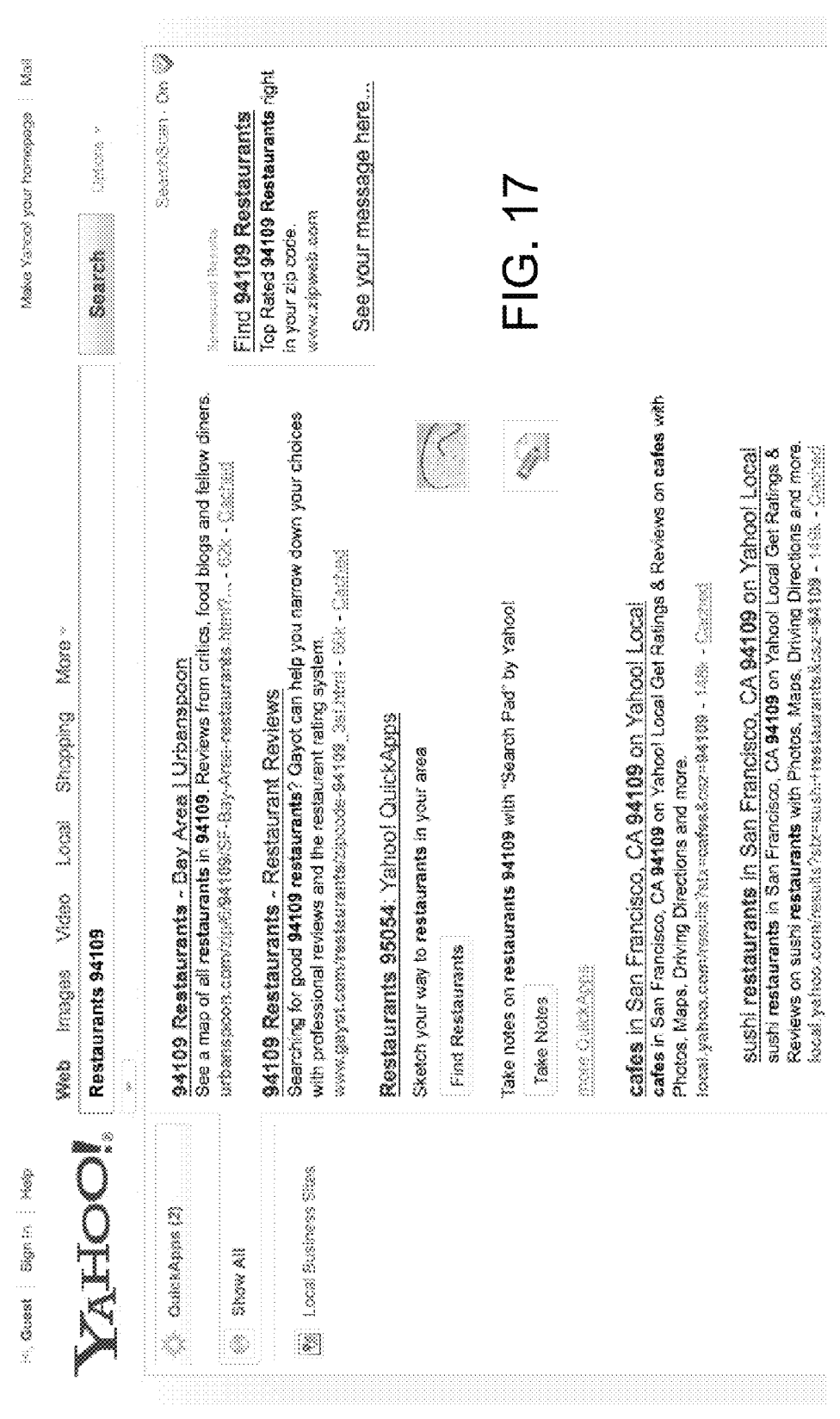

FIGS. 16-17 show several inline prompt examples. In FIG. 16 there are shown SRP in-line prompt examples leveraging convention result patterns for currency conversions. In FIG. 17 in-line prompts are shown responsive to the search for "restaurants 94109."

The invention offers a system to trigger applications that enables task completion within the SRP (e.g., find and book a restaurant, add your movie searches to Netflix®). This task completion is based on an understanding of what the user is trying to achieve and then surfacing contextually relevant tools. Referring to FIG. 11, we discuss an example of the invention.

1. A user enters a query, for example "Pizza 94109;"
2. The system identifies which application will help the user with this type of query and displays a call to action (CTA) within the algorithm results. The CTA format can be seen in FIG. 16 and will include, but is not limited to, the following:
   a) Title: this includes the initial user query and title of the application ie pizza 94109-Sketch-a-search.
   b) Application description: This gives a brief outline of what the application does.
   c) Uniform Resource Locator (URL) of the app: this is the location as to where the application is stored, i.e. search.yahoo.com/searchapps.
3. On click, the system triggers the haptic search feature application. This contains an interactive map, reviews, and possibly recommends a Pizza store in the given zip code.

The system as described provides a framework for a meaningful search experience. The components of this system are:
1. Application Triggering logic (based on QP models and expanded);
2. Application prompts (User CTA points on the SRP);
3. Application dock in the Left hand rail;
4. Application overlays (windows) to support applications (e.g., Yahoo Application Platform, YAP, canvas)

Advantages: the framework offers an internal solution to allow rapid development and integration without the need for a limited direct Front End resource. This is through the support of the YAHOO! Application Platform (YAP). This will reduce the bottle neck resource moving forward.

Figure 18:
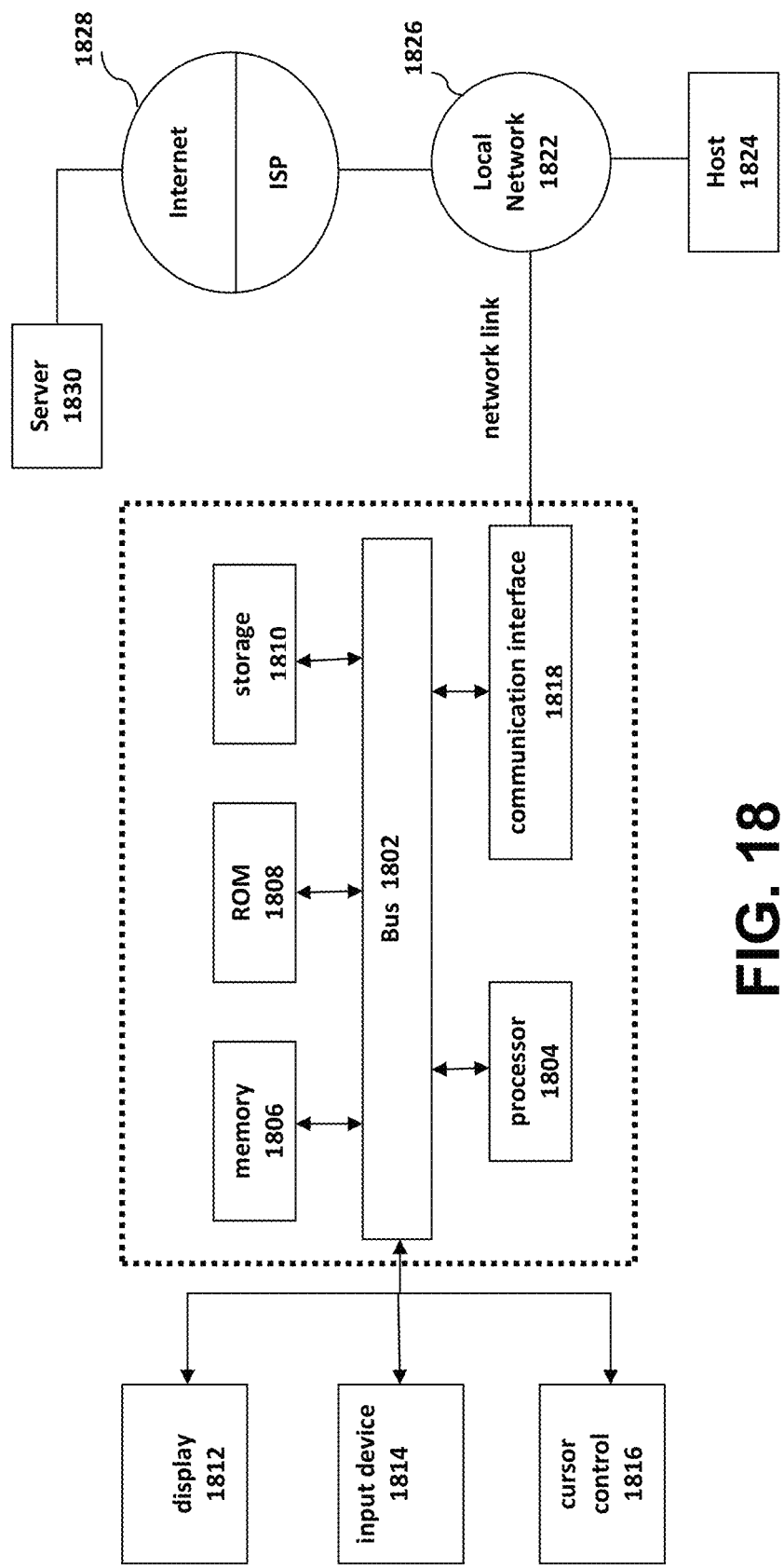
FIG. 18 is a high level block diagram showing an information processing system configured to operate according to an embodiment of the present invention.

Referring now to FIG. 18 there is shown a high-level block diagram illustrating an information processing system 1800 upon which an embodiment of the present invention may be implemented. System 1800 includes a bus 1802 or other communication mechanism for communicating information, and one or more processors, such as processor device 1804 coupled with bus 1802 for processing information. System 1800 also includes a main memory 1806, such as a random access memory (RAM) or other dynamic storage device, coupled with bus 1802 for storing information and instructions to be executed by processor device 1804. Main memory 806 also may be used for storing temporary variables or other intermediate information during execution of instructions to be executed by process device 1804. System 1800 further includes, inter alia, a read only (ROM) memory 1808 or other static storage device, coupled with bus 1802 for storing static information and instructions for processor device 1804. A storage device 1810, such as a magnetic disk or optical disk, is provided and coupled with bus 1802 for storing information and instructions.

System 1800 is operatively coupled with display 1812, such as a computer monitor, for displaying information to the user. An input device 1814, including alphanumeric and other keys, is also operatively coupled with the system 1800. A cursor control device 1816, such as a mouse, a trackball, or cursor direction keys is provided for communicating direction, information and command selections to processor device 1804 and for controlling cursor movement on display 1812. This input device 1814 typically has two degrees of freedom in two axes, a first axis (e.g. x) and a second axis (e.g. y) that allows the device to specify positions in a plane. The display 1812 may also function as the input device such as in the touch-screen interfaces in the iPad™ and iPhone® mobile digital devices by Apple®, among others.

In an embodiment of the present invention, computer system 1800 is used for implementing a search engine (or search engines) to produce optimized search results by embedding apps within the SRP. According to one embodiment of the invention, the search results page is optimized and provided by system 1800 in response to processor device 1804 executing one or more sequences of one or more instructions contained in memory 1806. The SRP may be displayed on display 1812. The user of computer system 1800 uses the input device 1814 to enter the search query.

System 1800 also includes a communication interface 1818 providing a two-way communication coupling with a network link 1820 that is connected to a local network 1822. Examples of a communications interface 1818 may include a modem, a network interface (such as an Ethernet card), a communications port, a PCMCIA slot and card, etc. Software and data transferred via communications interface 1818 are in the form of signals which may be, for example, electronic, electromagnetic, optical, or other signals capable of being received by communications interface 1818. These signals are provided to communications interface 1818 via a communications path (i.e., channel).

Network link 1820 typically provides data communication through one or more networks to other devices. Network link 1820 may provide a connection through local network 1822 to a host computer 1824 or to a web browser providing access, through the Internet to a Search Engine 1828. According to an embodiment of the present invention, an SRP interface 1826 is a layer between the user and the Search Engine 1828, providing support for the receipt and processing of the mouse gestures or alternate inputs.

In the above description, numerous specific details are set forth by way of exemplary embodiments in order to provide a more thorough description of the present invention. It will be apparent, however, to one skilled in the art, that the present invention may be practiced without these specific details. In other instances, well-known features have not been described in detail so as not to obscure the invention. The preferred embodiments of the inventions are described herein in the Detailed Description, Figures and Claims. Unless specifically noted, it is intended that the words and phrases in the specification and claims be given the ordinary and accustomed meaning as understood by those of skill in the applicable art. If any other meaning is intended, the specification will specifically state that a special meaning is being applied to a word or phrase.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable medium such as a DVD-ROM that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Therefore, while there has been described what is presently considered to be the preferred embodiment, it will understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

We claim:

1. A search method comprising steps of:
   receiving one or more search terms at an information processing device;
   searching an index for the one or more search terms to generate search results;
   retrieving the search results, wherein some of the search results comprise web pages associated with application programs;
   preparing a search results page for presentation to the user, wherein said search results page comprises at least a partial listing of the search results;
   presenting the search results page with a search tool pod located on a portion of the search results page without obscuring the search results, such that both the search results and said search tool pod are visible;
   wherein said search tool pod comprises a list of interactive, executable application modules that, when activated, execute the application programs associated with the at least partial search results directly from the search results page without a page reload;
   receiving a selection of a first application module; and
   presenting the first application module for user interaction in an area of the search results page that is smaller than an entirety of the search results page.

2. The search method of claim 1 wherein the step of presenting the search results page comprises displaying the web page on a computer display.

3. The search method of claim 1 wherein presenting the first application module comprises presenting a window overlay for modules that do not require a wide area display.

4. The search method of claim 1 further comprising:
   responsive to the user interaction, performing computations and searches from within the application module without a page reload.

5. The search method of claim 1 wherein the search tools pod is non-session aware and remains in state once opened.

6. The search method of claim 1 wherein presenting the search tool pod comprises presenting a drop down menu listing the application modules.

7. The search method of claim 1 further comprising presenting an inline prompt optimized for system engagement together with and in close proximity to the search tool pod.

8. The search method of claim 1 wherein the step of retrieving the search results comprises retrieving web pages that are preselected as being of interest to the user.

9. The search method of claim 3 wherein presenting the window overlay comprises offsetting the window overlay such that the search tool pod and at least a portion of the search results are visible.

10. The search method of claim 3 wherein all page elements outside the window overlay are locked out until the window overlay is closed.

11. The search method of claim 3 wherein clicking anywhere off the window overlay closes the window overlay.

12. The search method of claim 3 wherein the entire search results area is pushed down by an application stage surface.

13. The search method of claim 3 further comprising:
    receiving a selection of a second application module, wherein receiving the selection of the second application module places the first application module in an inactive state; and
    presenting the second application module for user interaction.

14. The search method of claim 6 further comprising providing an option for rating the application within the search tool pod.

15. The search method of claim 8 wherein the preselected web pages are triggered by query planner technology and whitelists.

16. A computer system configured to perform searches, said computer system comprising:
    an information processor device configured for:
       receiving one or more search terms;
       searching an index for the one or more search terms to generate search results;
       retrieving the search results for presenting to a user, wherein some of the search results comprise web pages associated with application programs;
       preparing a search results page for presentation on a computer display, wherein said search results page comprises at least a partial listing of the search results;
       presenting the search results page with a search tool pod located on a portion of the search results page without obscuring the search results, wherein said search tool pod comprises a list of interactive, executable application modules that, when activated, execute the application programs associated with the web pages directly from the search results page without a page reload;
       receiving a selection of a first application module; and
       presenting the first application module for user interaction in an area of the search results page that is smaller than an entirety of the search results page.

17. The computer system of claim 16 wherein presenting the first application module comprises presenting a window overlay for modules that do not require a wide area display.

18. The computer system of claim 16 wherein the information processor device is further configured for performing computations and searches from within the application module without a page reload responsive to the user interaction.

19. A computer program product comprising a non-transitory computer readable storage medium with computer program instructions embodied therein, said computer program instructions causing a computer to perform steps of:
    receiving one or more search terms;

searching an index for the one or more search terms to generate search results;

retrieving the search results for presenting to a user, wherein some of the search results comprise web pages associated with application programs;

preparing a search results page for presentation on a computer display, wherein said search results page comprises at least a partial listing of the search results;

presenting the search results page with a search tool pod located on a portion of the search results page without obscuring the search results, wherein said search tool pod comprises a list of interactive, executable application modules that, when activated, execute the application programs associated with the web pages directly from the search results page without a page reload;

receiving a selection of a first application module; and presenting the first application module for user interaction in an area of the search results page that is smaller than an entirety of the search results page.

20. The computer program product of claim 19, wherein the computer program instructions further cause the computer to perform a step of performing computations and searches from within the application module without the page reload, responsive to the user interaction.

\* \* \* \* \*